(No Model.)
B. I. PRICE.
JOINT FOR SPECTACLE FRAMES.
No. 426,422. Patented Apr. 22, 1890.
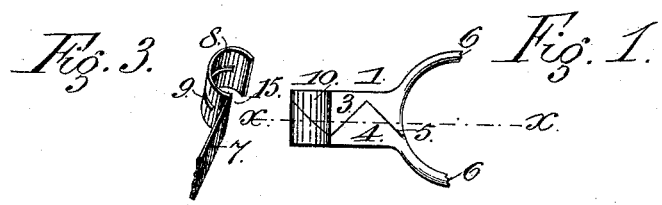
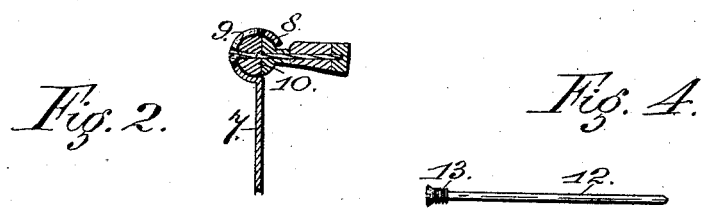
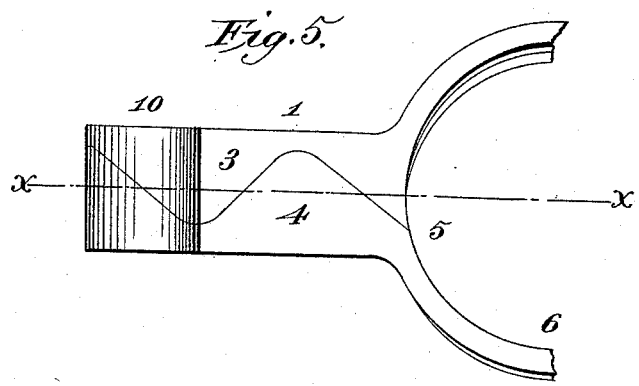
WITNESSES:
INVENTOR
Benjamin I. Price
BY
A. J. O'Brien
ATTORNEY

UNITED STATES PATENT OFFICE.

BENJAMIN I. PRICE, OF DENVER, COLORADO.

JOINT FOR SPECTACLE-FRAMES.

SPECIFICATION forming part of Letters Patent No. 426,422, dated April 22, 1890.

Application filed September 11, 1889. Serial No. 323,686. (No model.)

*To all whom it may concern:*

Be it known that I, BENJAMIN I. PRICE, a citizen of the United States, residing at Denver, in the county of Arapahoe and State of Colorado, have invented certain new and useful Improvements in Joints for Spectacle-Frames; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in joints for spectacle-frames; and the object of my improvement is to provide a joint of few parts, simple and economical in construction, easily operated, efficient, and durable; to which ends my invention consists of the features and arrangements hereinafter described and claimed.

In the drawings is illustrated an embodiment of my improvement, in which drawings Figure 1 is a top or plan view of the device with the temple and locking screw-pin removed. Fig. 2 is a vertical section taken on the line *x x*, Fig. 1, showing the temple and screw-pin in place. Fig. 3 is a perspective view of the extremity of the temple adjacent to the bow of the frame. Fig. 4 is an elevation of the screw-pin. Fig. 5 is a plan view showing the same mechanism shown in Fig. 1, except that in Fig. 5 the bar is divided on a tortuous line, while in Fig. 1 said bar is divided on a zigzag or broken line.

In the views, let the reference-numeral 1 indicate a bar composed of two sections 3 and 4, which may be formed by dividing a solid bar on the zigzag or broken line 5. For the purposes of my invention line 5 may be curved as well as zigzag or broken.

The bow 6 of the frame merges in or is continuous with the parts 3 and 4 of the divided bar 1.

The outer extremity 10 of the bar 1 is cylindrical in shape, as shown in Fig. 2. The extremity 8 of the temple 7 is concavo-convex and fashioned to fit nicely over cylindrical part 10 of the bar 1. The curved extremity 8 of the temple is sufficiently open at 15 to allow the temple sufficient movement upon its bearing for purposes of adjustment. The frictional contact of the temple upon its cylindrical bearing is always such as to retain the temple in any desired position. The extremity 8 of the temple is provided with a slot 9, distinctly shown in Fig. 3.

Bar 1, considered as integral, is provided with a hole drilled nearly through its longitudinal center for the reception of the screw-pin 12.

In assembling the parts of the joint the extremity 8 of the temple is slipped over the cylindrical part 10 of bar 1. The pin 12 is then placed in position, as shown in Fig. 2, passing through slot 9 and securely connecting sections 3 and 4 of bar 1. When pin 12 is in position, as shown in Fig. 2, it permits the necessary adjustment of the temple 7 by turning its extremity 8 upon its cylindrical bearing, the slot 9 being of sufficient length for that purpose. The opening 15 of curved part 8 of the temple should be somewhat less than half of a circle or small enough to prevent the cylindrical part 10 from passing therethrough, while the pin 12 prevents part 8 from slipping from bearing 10 on a line at right angles to slot 9. The pin 12 is itself held in the position shown in Fig. 2 by a few threads 13 cut upon its upper portion next to the head of the pin, the upper part of the opening for the screw in bar 1 being threaded to correspond with threads 13 upon the pin.

Though my improved joint is designed more particularly for use in spectacle-frames, I do not limit myself to its use for that purpose, as I am aware that it may be used in other connections.

Having thus described my invention, what I claim is—

1. In a joint for spectacle-frames, the bar 1, composed of sections 3 and 4, the shape of the contact-surfaces of these sections being indicated by the zigzag or broken line 5, the bar thus formed being provided with a cylindrical bearing 10 and an opening for a pin, as described, the temple 7, provided with a concavo-convex extremity 8, having a slot 9, and the pin 12, provided with threads 13, these elements being arranged and connected substantially as described.

2. A bar divided on the tortuous line 5 into two sections 3 and 4 and terminating at one extremity in the cylindrical joint-bearing 10, the two sections being united by a suitable locking-pin, substantially as described.

3. In a joint, the combination of a solid bar 1, provided with a cylindrical part 10, a concavo-convex part 8, provided with a slot 9 and adapted to fit nicely upon cylindrical part 10, and locking-pin 12, the bar 1 being provided with an opening for the reception of said pin, substantially as described.

4. In a joint for spectacle-frames, the bar 1, composed of sections 3 and 4, the shape of the contact-surface of these sections being indicated by a zigzag or broken line, the bar thus formed being provided with a cylindrical bearing 10 and an opening for a locking-pin, as described, the temple 7, provided with a concavo-convex extremity, having a slot 9, and a suitable locking-pin, all arranged and connected substantially as described.

5. A bar divided on the zigzag or broken line 5 into two sections 3 and 4 and terminating at one extremity in the cylindrical joint-bearing 10, the two sections being united by a suitable locking-pin, substantially as described.

6. In a joint for spectacle-frames, the bar 1, composed of sections 3 and 4, the shape of the contact-surface of these sections being indicated by the tortuous line 5, the bar thus formed being provided with a cylindrical bearing 10, the temple 7, provided with a concavo-convex extremity having a slot 9, sections 3 and 4 being united by a suitable locking-pin, substantially as described.

In testimony whereof I affix my signature in presence of two witnesses.

BENJAMIN I. PRICE.

Witnesses:
WM. KOWALSKI,
WM. MCCONNELL.